United States Patent [19]
Stanton

[11] 3,958,833
[45] May 25, 1976

[54] HEAT SHIELD AND DRIVE KEY APPARATUS FOR DISC BRAKE

[75] Inventor: George E. Stanton, South Bend, Ind.

[73] Assignee: The Bendix Corporation, South Bend, Ind.

[22] Filed: Oct. 29, 1974

[21] Appl. No.: 518,316

[52] U.S. Cl. .............................. 301/6 A; 301/6 R; 301/6 CS; 301/6 WB; 188/71.5
[51] Int. Cl.² ........................................ A63C 17/12
[58] Field of Search ................ 301/6 R, 6 A, 6 WB, 301/6 CS, 6 E; 188/71.5, 71.6; 192/70.2, 70.17, 55

[56] References Cited
UNITED STATES PATENTS
3,829,162  8/1974  Stimson .............................. 301/6 A Primary Examiner—Allen N. Knowles
Assistant Examiner—D. W. Keen
Attorney, Agent, or Firm—Gordon H. Chenez; William N. Antonis

[57] ABSTRACT

A cylindrical heat shield provided with circumferentially spaced apart axially extending drive members adapted to engage the wheel and a plurality of brake rotor friction discs interleaved with a plurality of brake stator friction discs which discs are adapted to be urged axially into engagement to retard rotation of the wheel. The shield surrounds the plurality of rotor and stator discs and reduces undesirable heat influx to the wheel from the plurality of friction discs radially inward therefrom.

13 Claims, 5 Drawing Figures

HEAT SHIELD AND DRIVE KEY APPARATUS FOR DISC BRAKE

BACKGROUND OF THE INVENTION

Various forms of heat shields are known and used as thermal protection for a wheel and pneumatic tire mounted thereon against the influx of heat generated by a high performance disc brake completely or partially housed in the wheel. Reference is made to U.S. Pat. No. 3,051,528 to Raymond R. Rogers (common assignee) and U.S. Pat. Application Ser. No. 424,142 filed Dec. 12, 1973 in the name of C. P. Han (common assignee) now abandoned for examples of pertinent heat shields.

Heat shields of the above-mentioned prior art type are not entirely satisfactory for one or more reasons including limited ability to retard heat flow, exposure to dirt and/or brake debris which tends to adhere to the shield causing disassembly problems as well as reduced efficiency, maintenance requirements which may be time consuming and expensive, and limited clearance with the inner surface of the wheel and/or outer periphery of the stack of brake discs thereby restricting air flow volume over the same as well as making installation and/or removal of the wheel from the brake difficult.

Also depending upon the material from which the friction discs are made as, for example, carbon, it has been found that the frictional characteristics of the material are adversely affected by water, brake fluid or similar liquids that may drip or otherwise be thrown into the brake.

SUMMARY OF THE INVENTION

The present invention relates to a heat shield for a high performance multiple-disc disc brake having a brake assembly mounted radially inwardly of a wheel exposed to heat generated by the brake assembly and, in particular, an aircraft disc brake wherein weight, volume and reliability are of primary consideration.

It is an object of the present invention to provide a continuous annular heat shield adapted to fit between a rotatable wheel and a disc brake assembly disposed radially inwardly thereof and provided with drive members for interconnecting the wheel and rotatable discs of the brake.

It is another object of the present invention to provide a shield for inhibiting heat flow to a wheel from a brake assembly mounted radially inwardly thereof.

DESCRIPTION OF THE PREFERRED EMBODIMENTS

Figure 1:
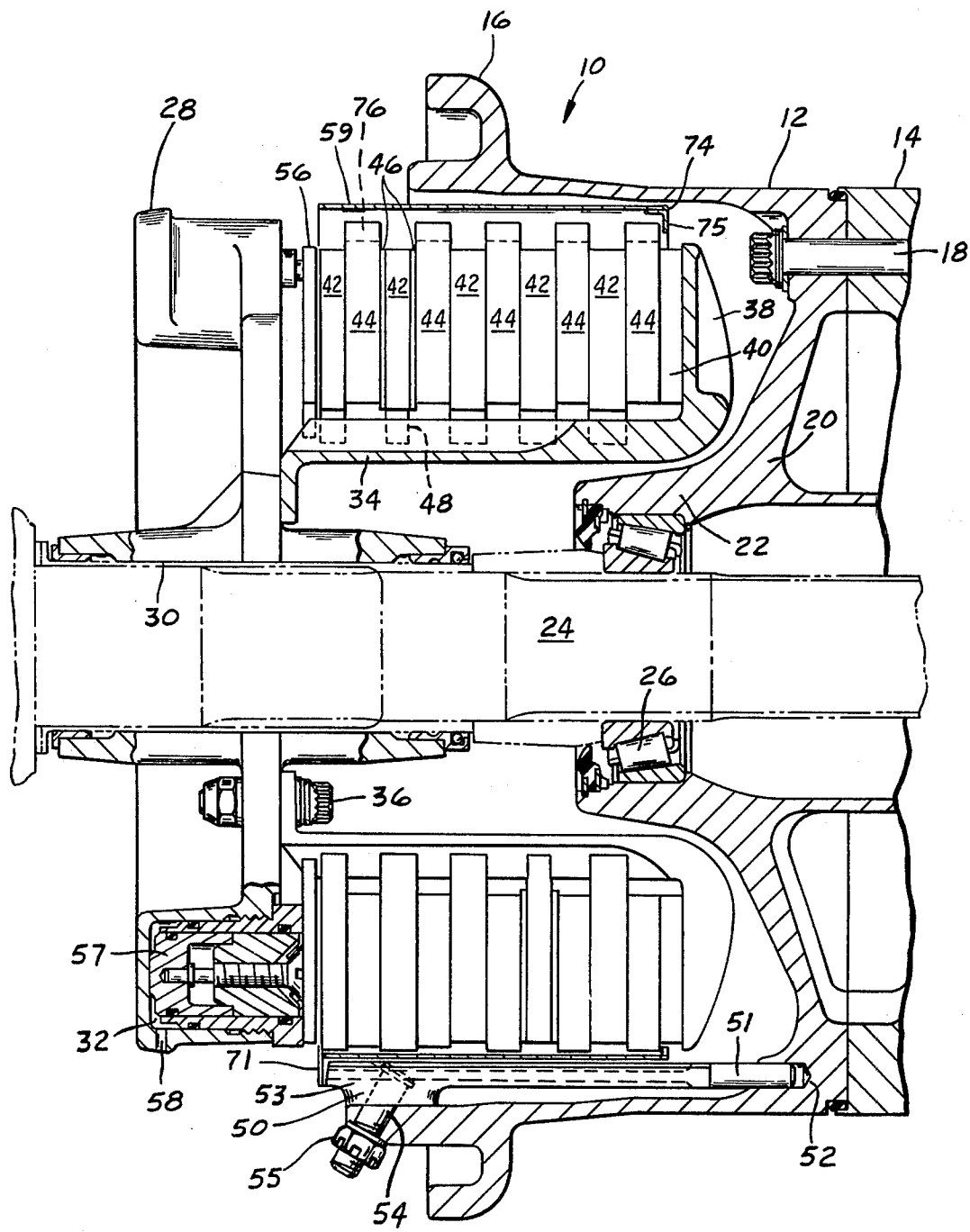
FIG. 1 is a section view of an aircraft wheel and brake embodying the present invention.
Figure 2:
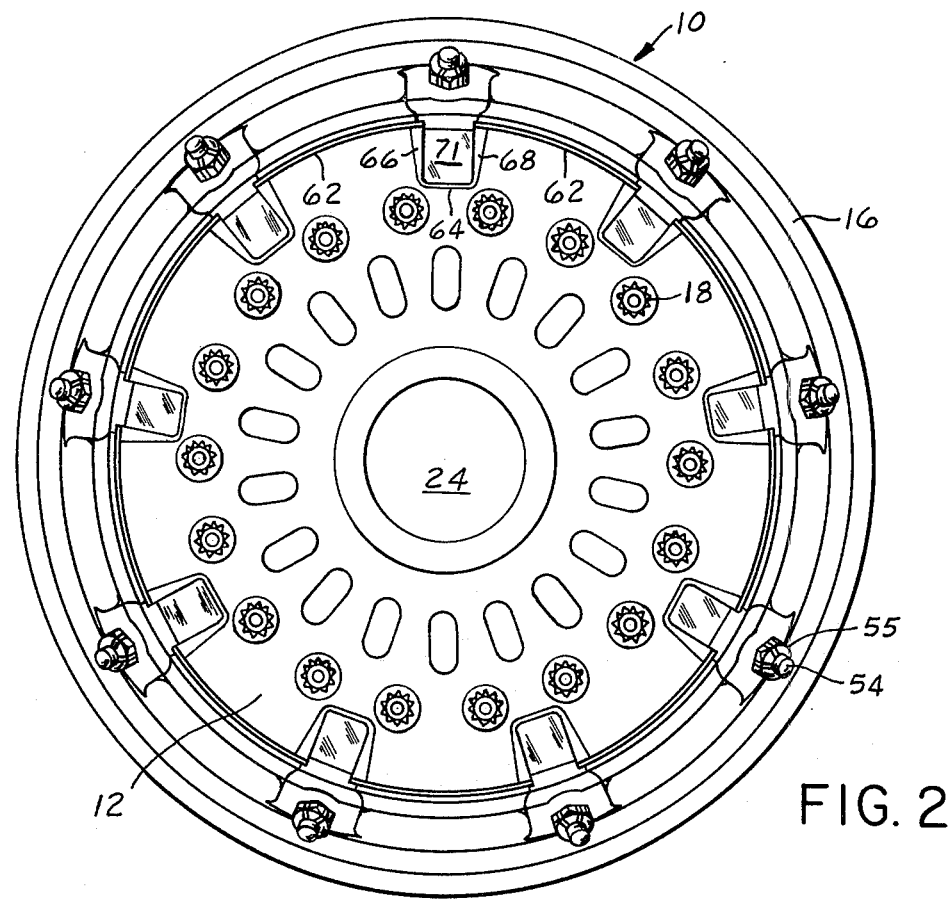
FIG. 2 is a plan view of the wheel and brake of FIG. 1 with the brake apparatus removed to more clearly show the present invention.

Referring to the drawings and in particular FIG. 1, numeral 10 designates a conventional aircraft wheel and brake assembly including annular wheel half portions 12 and 14, only one of which is shown, in cross section. The wheel portions 12 and 14 are each provided with a tire retaining flange portion 16 for retaining a tire, not shown, thereon. A plurality of circumferentially spaced apart bolt and nut combinations 18 serve to fixedly secure the wheel portions 12 and 14 together. The wheel portion 12 is provided with integral web portions 20 and a hub portion 22 and is rotatably carried on a fixed axle 24 by conventional bearing means 26.

A rotatably fixed annular brake carrier 28 secured to fixed axle 24 by suitable conventional keys or splines 30 is provided with a plurality of circumferentially spaced apart cavities or chambers 32 only one of which is shown. An annular torque tube 34 is fixedly secured to brake carrier 28 by a plurality of circumferentially spaced apart bolts 36, only one of which is shown, extending through mating openings in carrier 28 and torque tube 34. The torque tube 34 is provided with an integral annular brake backing plate 38 having a layer of friction material or lining 40 fixedly secured thereto.

A plurality of annular brake stator members or discs 42 are interleaved with a plurality of annular brake rotor members or discs 44. The brake stator members 42 are each provided with lining 46 fixedly secured to opposite faces thereof and are suitably keyed as at 48 for axial movement to torque tube 34 by means including axially extending slots 49 in torque tube 34. A plurality of circumferentially spaced apart key members 50 are fixedly secured to wheel portion 12 and extend axially relative thereto. A plurality of circumferentially spaced apart slots 47 in the radially outermost portion of rotor disc 44 receive the plurality of key members 50 thereby providing a driving connection rotationally between wheel portion 12 and rotor discs 44 which driving connection also permits slidable motion of rotor discs 44 axially relative to wheel portion 12. The connection provided by key members 50 and slots 47 is conventional and will be recognized as so-called "key-slot drive means". The key members 50 are each provided with an end portion 51 slidably received by a mating recess 52 in wheel portion 12. The opposite end portion 53 of key member 50 is bored to receive a bolt 54 which also extends through wheel portion 12 and is threadedly engaged by a lock nut 55 to thereby secure key member 50 in position. The key member 50 may be formed as an integral part of wheel portion 12 in which case the end portion 51, bolt 54 and nut 55 are not required. The interleaved or stacked rotors 44 and stators 42 are adapted to be compressed together between backing plate 38 and movable pressure plate 56 to provide the desired braking or retardation of the wheel. The pressure plate 56 is actuated by a plurality of fluid pressure activated pistons 57 each of which are slidably carried in an associated chamber 32 which chamber is supplied pressurized fluid via a passage 58 communicating with an operator controlled fluid pressure source, not shown.

During a brake application, the rotor and stator discs, 44 and 42, may become extremely hot thereby imposing a corresponding high heat load on the entire circumferential rim portion of wheel portions 12 and 14 radially outwardly therefrom which, in turn, results in an undesirable temperature rise of the tire, not shown, engageable with flange portions 16.

It will be recognized that a heat shield which functions to minimize the transfer of heat from the rotor and stator discs, 44 and 42, to the wheel portions 12 and 14 radially outwardly therefrom is desirable. To that end, the present invention provides a continuous annular band generally indicated by numeral 59 adapted to be inserted axially into position between the rotor and stator discs 44 and 42 and wheel portion 12 radially outwardly therefrom.

The annular band 59 is formed of a plurality of circumferentially spaced apart band key members 60 interconnected by sheet metal sections 62 of stainless steel or similar material suitably fixedly secured thereto. Each band key member 60 is elongated and provided with a base portion 64 and upstanding side portions 66 and 68 integral therewith thereby defining a channel 70 adapted to slidably engage a key member 50. Adjacent band key members 60 are joined by a sheet metal section 62 opposite edges of which overlap the flat edge of associated side portions 66 and 68 and are fixedly secured thereto by any suitable means such as welding. Each band key member 60 is provided with a stop at one end thereof which may take the form of a transverse plate 71 fixedly secured in position by any suitable means such as welding.

Three sheet metal sections 62 spaced 120° apart are made slightly longer than the remaining sections 62 in the axial direction of band 59. Each of the three spaced apart sheet metal sections 62 thus overhang the band key members 60 to which it is attached which overhang is identified by numeral 72. A sheet metal strip 74 which is preferably formed of the same material as sections 62 is bent longitudinally at a right angle and one side thereof fixedly secured to the overhanging portion 72 of each metal section 62 by any suitable means such as a weld. The remaining side of metal strip 74 extends perpendicular to the metal section 62 thereby providing a stop member 75 adapted to engage the radially outer side portion of a rotor 44 immediately adjacent thereto as will be described.

As indicated above each rotor disc 44 is provided with a plurality of circumferentially spaced apart slots 47 in the radially outermost portion thereof which slots are suitably shaped to slidably receive band key members 60 thereby providing for axial movement of rotors 44 relative to band or drum 59 while preventing relative rotational movement of rotors 44 relative to band 59. The side portions 66 and 68 of band key members 60 are tapered as shown at 78 resulting in the thickness thereof progressively increasing to a maximum at the flat edge of side portions 66 and 68 to which sheet metal sections 62 are attached. The sides of slots 47 are tapered to mate with the tapered side portions 66 and 68 thereby establishing a maximum bearing area between rotor discs 44 and band key members 60.

The sheet metal sections 62 may be made from a single sheet of metal as, for example, stainless steel of suitable thickness such as 0.0150 to 0.020 inches or a plurality of overlapping thinner sheets having a total thickness substantially equivalent to that of said single sheet. If desired, a layer of heat resistant material, not shown, may be applied directly to or interposed between inner and outer sheets of metal 62 thereby providing a composite section.

Figure 3:
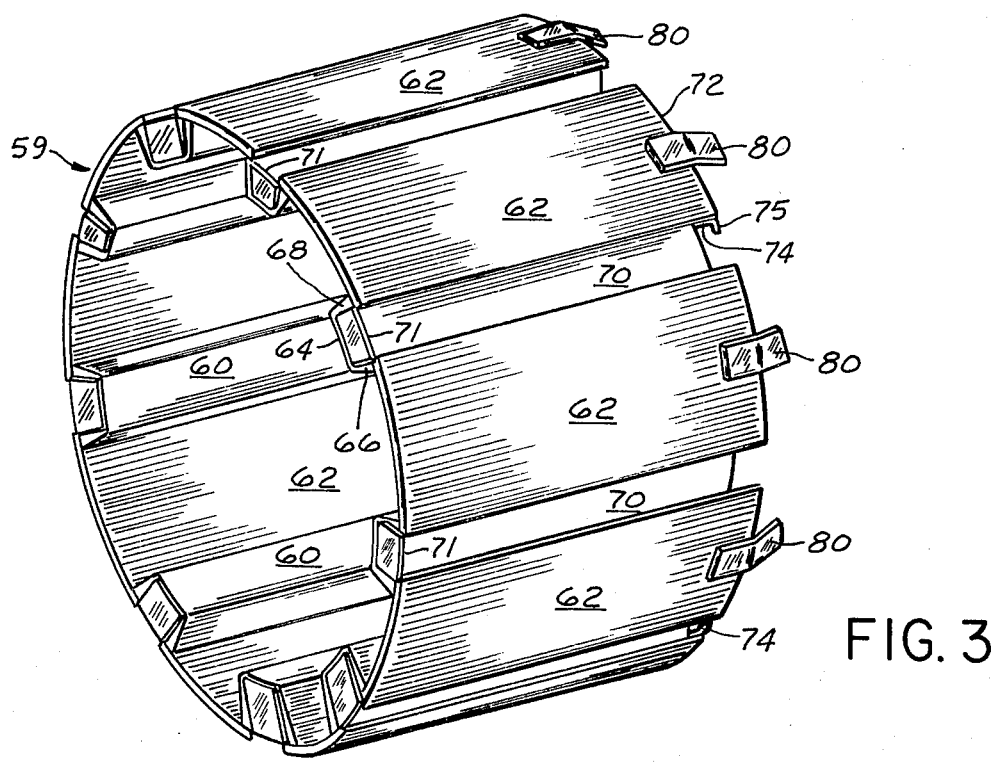
FIG. 3 is a perspective view of the present invention shown removed from the wheel of FIG. 2.
Figure 4:
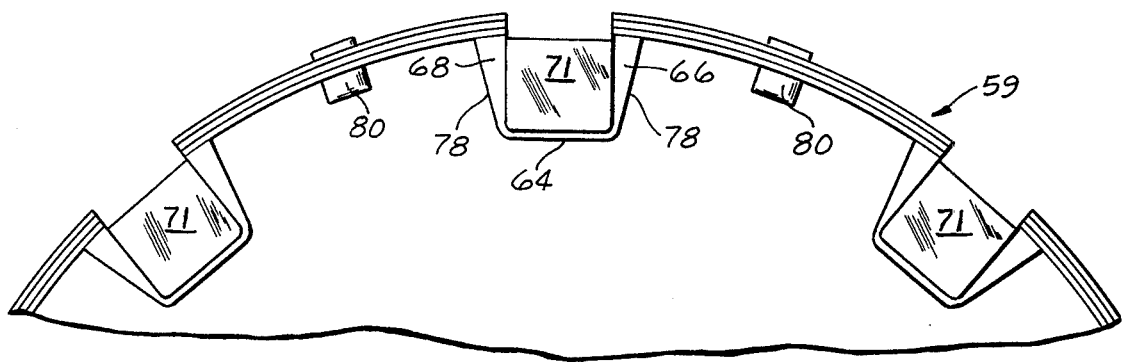
FIG. 4 is an end view of a portion of FIG. 3 showing a modified form of the present invention.
Figure 5:
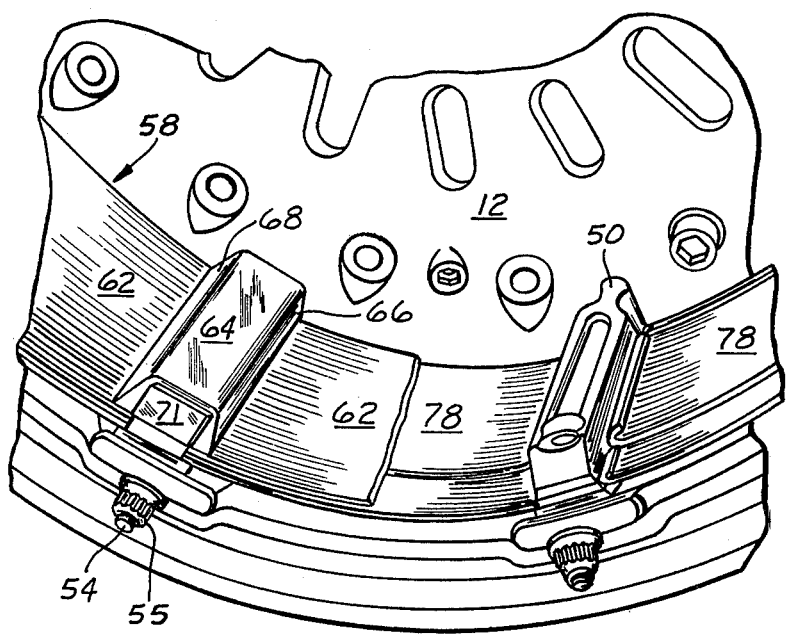
FIG. 5 is a perspective view of a portion of FIG. 2 showing a modified arrangement of the present invention wherein the heat shield or drum is combined with prior art heat shield apparatus to provide a double layer heat shield.

Referring to FIG. 5, the annular band 59 may, if desired, be used in conjunction with conventional heat shield apparatus as, for example, that shown and described in the above-mentioned U.S. Pat. No. 3,051,528. To that end, the segmented heat shield of U.S. Pat. No. 3,051,528 is shown in position between adjacent key members 50 and generally indicated by numeral 78. Assuming the heat shield segments 78 in position, as shown, the annular band 59 is adapted to slide along key members 50 in radially spaced relationship to heat shield segments 78 to the position shown overlapping segments 78. In this manner, a double barrier to heat flow from the stator and rotor members 42 and 44 to the wheel portion 12 radially outwardly therefrom is provided. Referring to FIG. 3, the band 59 may be provided with metal tabs 80 fixedly secured to sections 62 and extending therefrom radially inwardly at a suitable angle to facilitate guiding the band 59 within the segments 78 during assembly.

The annular band 59 is adapted for use on conventional wheel and brake structure with little modification of the latter. The band key members 60 may require enlargement of the rotor slots of the conventional disc brake wherein the key members 50 bear directly against the sides of the rotor slots.

The band 59 is easily mounted in position as shown in FIG. 1. Assuming the brake assembly including torque tube 34 with interleaved brake rotor and stator discs 44 and 42, respectively, mounted thereon to be bolted in position on carrier 28, the band 59 is slipped axially over the rotor and stator discs with band key members 60 sliding through aligned slots 47 to the extent provided by stop members 75 which engage the rotor disc 44 immediately adjacent backing plate 38. The assembled wheel including half portions 12 and 14 is mounted on axle 24 and key members 50 aligned with the respective channels 70 of key members 60 to permit the wheel section 12 to slide axially relative to the band 59 to the position shown in FIG. 1. The wheel is secured in position on axle 24 by means of conventional locking means, not shown.

After a given period of brake use, it has been found that the friction material 40 in a multiple disc brake normally experiences progressively less wear from the rotor disc 44 closest to pressure plate 56 to the rotor disc 44 closest to the backing plate 38.

It will be noted that the band 59 is retained in position axially relative to the rotor and stator discs 44 and 42 by the plates 71 which engage the ends of key members 50 and by stop members 75 which engage rotor disc 44 adjacent backing plate 38. It has been found that a multiple disc brake such as that shown in FIG. 1 has a tendency for the friction material 40 to wear the greatest at the rotor disc 44 adjacent pressure plate 56 and the least at the rotor disc 44 adjacent backing plate 38. The normal life of the friction material 40 is determined by the cumulative wear thereof on all of the friction surfaces involved. The amount of wear of the friction material 40 on the backing plate 38 can be expected to be relatively small and may be compensated for by suitable spacing of the plates 71 and associated stop members 75 to avoid engagement of plates 71 with key members 50 under the influence of rotor disc 44 bearing against stop members 75 during a brake application.

The band 59 provides a relatively close fitting shroud around the rotor and stator discs 44 and 42 thereby protecting the same from water and liquid contaminants such as aircraft cleaning fluids, oil, brake fluid or the like which contaminants tend to deteriorate the friction materials of the brake and which, in the case of carbon brakes wherein the rotor and/or stator discs, 44 and 42, are formed of carbon, tend to hasten oxidation of the carbon friction surfaces.

I claim:

1. Heat shield and drive apparatus for a wheel surrounded disc brake having a plurality of interleaved non-rotatable stator discs and rotatable rotor discs wherein the rotor discs are connected to and driven by the wheel through axially extending key-slot means, said apparatus comprising:
   an annular band concentric with said rotor and stator discs and slidable axially thereover to provide a shield between said wheel and said rotor and stator discs radially inward therefrom;
   said annular band including a plurality of circumferentially spaced apart axially extending drive means slidably engageable with said key-slot means and providing a drivable connection therebetween.

2. Heat shield and drive apparatus as claimed in claim 1 wherein:
   said annular band is defined by said plurality of spaced apart axially extending drive means which are interconnected by sections of sheet metal fixedly secured thereto.

3. Heat shield and drive apparatus as claimed in claim 2 wherein:
   said sections of sheet metal are flexible.

4. Heat shield and drive apparatus as claimed in claim 2 wherein:
   said sections of sheet metal are each defined by a plurality of layers of sheet metal fixedly secured at opposite ends thereof to adjacent drive means.

5. Heat shield and drive apparatus as claimed in claim 1 wherein:
   said spaced apart axially extending drive means are each characterized by a U-shaped cross section and adapted to receive a key member fixedly secured to the wheel;
   said U-shaped drive means is received by a slot formed in the radially outermost portion of said rotor discs.

6. Heat shield and drive apparatus as claimed in claim 5 wherein:
   said U-shaped drive means is provided with side portions having angled outer surfaces thereby defining a general wedge shape;
   said slot is provided with angled side portions to mate with said U-shape drive means received thereby.

7. Heat shield and drive apparatus as claimed in claim 5 wherein:
   said U-shaped drive means is provided with a first stop member on one end thereof and engageable with said key member to thereby limit axial movement of said annular wall in one axial direction relative to said wheel.

8. Heat shield and drive apparatus as claimed in claim 7 wherein:
   said first stop member is a transverse plate member fixedly secured to said one end.

9. Heat shield and drive apparatus as claimed in claim 7 and further including:
   a section of sheet metal fixedly secured to adjacent U-shaped drive means;
   a second stop member fixedly secured to at least one of said sections of sheet metal in axially spaced apart relationship to said first stop member and engageable with an adjacent axially outermost rotor disc to thereby limit axial movement of said annular wall relative to said rotor disc.

10. Heat shield and drive apparatus as claimed in claim 9 wherein:
    said first stop member is a transverse plate member fixedly secured to said one end; and
    said second stop member is an arcuate member fixedly secured to said one of said sections of sheet metal and extending radially inwardly thereof.

11. Heat shield and drive apparatus as claimed in claim 1 wherein:
    said annular wall includes a plurality of circumferentially spaced apart axially extending drive means slidably engageable with said key-slot means; and
    a generally rectangular flexible sheet of stainless steel fixedly secured at opposite ends thereof to adjacent drive means.

12. Heat shield and drive apparatus as claimed in claim 1 wherein:
    said annular band is provided with axially spaced apart stop means for maintaining said annular band in position axially relative to said plurality of interleaved rotor and stator discs.

13. Heat shield and drive apparatus as claimed in claim 1 wherein said axially extending key means includes a plurality of circumferentially spaced apart radially inwardly extending key members secured to said wheel, said heat shield and drive apparatus further including:
    an arcuate section of sheet metal interposed between adjacent circumferentially spaced apart key members to thereby define a substantially continuous heat shield;
    said annular band being concentric with and spaced radially inwardly from said substantially continuous heat shield.

* * * * *